(12) United States Patent
Hsu et al.

(10) Patent No.: US 7,578,049 B2
(45) Date of Patent: Aug. 25, 2009

(54) METHOD FOR CONSTRUCTING A MAGNETIC WRITE POLE FOR A PERPENDICULAR MAGNETIC RECORDING HEAD

(75) Inventors: Yimin Hsu, Sunnyvale, CA (US); Vladimir Nikitin, Campbell, CA (US); Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 277 days.

(21) Appl. No.: 11/525,788

(22) Filed: Sep. 21, 2006

(65) Prior Publication Data
US 2008/0072417 A1  Mar. 27, 2008

(51) Int. Cl.
*G11B 5/127* (2006.01)
*H04R 31/00* (2006.01)

(52) U.S. Cl. .............. 29/603.16; 29/603.13; 29/603.14; 29/603.15; 29/603.18; 216/65; 360/121; 360/122; 360/317; 451/5; 451/41

(58) Field of Classification Search . 29/603.13–603.16, 29/603.18; 216/65; 360/121, 122, 317; 451/5, 451/51
See application file for complete search history.

(56) References Cited

U.S. PATENT DOCUMENTS

| | | | | |
|---|---|---|---|---|
| 5,444,023 | A * | 8/1995 | Homma | 438/631 |
| 7,120,988 | B2 * | 10/2006 | Le et al. | 29/603.07 |
| 2002/0154451 | A1 | 10/2002 | Dimitrov et al. | 360/317 |
| 2004/0103524 | A1 | 6/2004 | Breyta et al. | 29/603.03 |
| 2004/0161636 | A1 | 8/2004 | Hujanen et al. | 428/692 |
| 2005/0068665 | A1 | 3/2005 | Le et al. | 360/97.01 |
| 2005/0068672 | A1 | 3/2005 | Lee et al. | 360/126 |
| 2007/0245545 | A1 * | 10/2007 | Pentek et al. | 29/603.13 |

\* cited by examiner

*Primary Examiner*—Paul D Kim
(74) *Attorney, Agent, or Firm*—Zilka-Kotab, PC

(57) ABSTRACT

A method for manufacturing a write pole for a perpendicular magnetic write head. The method includes forming a mask structure over a full film layer of magnetic write pole material. A layer of hard mask material such as conformally deposited alumina is then deposited full film over the mask and write pole material. An ion mill, such as in an Ar or CHF3 chemistry is then used to preferentially remove horizontally disposed portions of the alumina layer (hard mask layer), thereby forming vertical hard mask walls at the sides of the mask structure. An ion mill is then used to form the write pole, with the alumna side walls providing excellent masking for forming well defined write pole edges. A relatively gentle clean up process can then be performed to remove the remaining mask material and side walls.

20 Claims, 10 Drawing Sheets

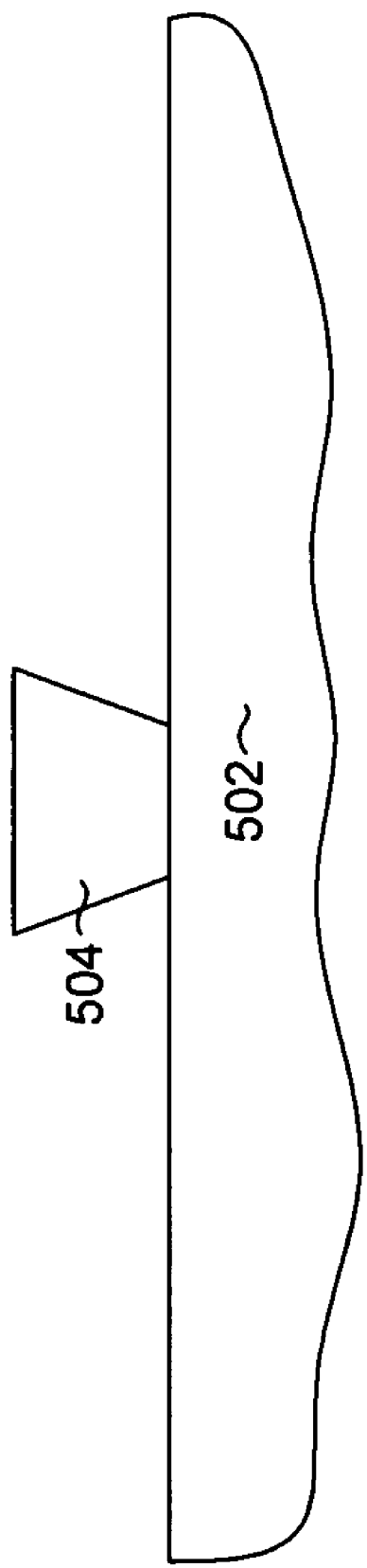

METHOD FOR CONSTRUCTING A MAGNETIC WRITE POLE FOR A PERPENDICULAR MAGNETIC RECORDING HEAD

FIELD OF THE INVENTION

The present invention relates to perpendicular magnetic recording and more particularly to a method for manufacturing a write pole for a perpendicular magnetic write head.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

The construction of a write pole has typically involved depositing a magnetic material (the write pole material) and then forming a mask over the magnetic material. Once the mask has been defined, an ion mill can be performed to remove portions of the magnetic material that are not protected by the mask. In order to construct a mask that can withstand the ion milling process used to define the write pole, and in order to form a well defined write pole with a flat, straight trailing edge, masks have included a hard mask layer such as a layer of alumina directly on top of the magnetic material.

Unfortunately, this hard mask layer is difficult to remove when defining the mask structure (ie. when transferring the image of the mask onto the hard mask) and is also difficult to remove after the write pole has been formed. For example, the removal of the hard mask layer requires the use of a process such as Reactive Ion Beam Etching (RIBE), which damages the write pole.

Therefore, there is a need for a method for manufacturing a write pole that can facilitate mask formation and removal. Such a method would preferably result in a well defined write pole having a well defined, damage free trailing edge.

SUMMARY OF THE INVENTION

The present invention provides a method for manufacturing a write pole for a perpendicular magnetic write head. The invention includes depositing a magnetic write pole material over a substrate, and then forming a mask structure over the write pole material. A hard mask material, such as alumina, can then be deposited over the mask and write pole material. A material removal process such as ion milling is then performed to preferentially remove horizontally disposed portions of the alumina layer resulting in vertical hard mask walls being formed on the sides of the mask structure. An ion mill can then be performed to define the write pole, with the alumina side walls ensuring sharp, well defined write pole edges.

The use of the hard mask side walls (alumina side walls) eliminates the need for an alumina hard mask that completely covers the magnetic write pole material. This advantageously eliminates the need for an aggressive material removal process for removing such an alumina hard mask. This advantageously avoids damage to the write pole during manufacture.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

FIGS. 5-10 are views of a write head in various intermediate stages of manufacture illustrating a method of manufacturing a write head according to a possible embodiment of the invention.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
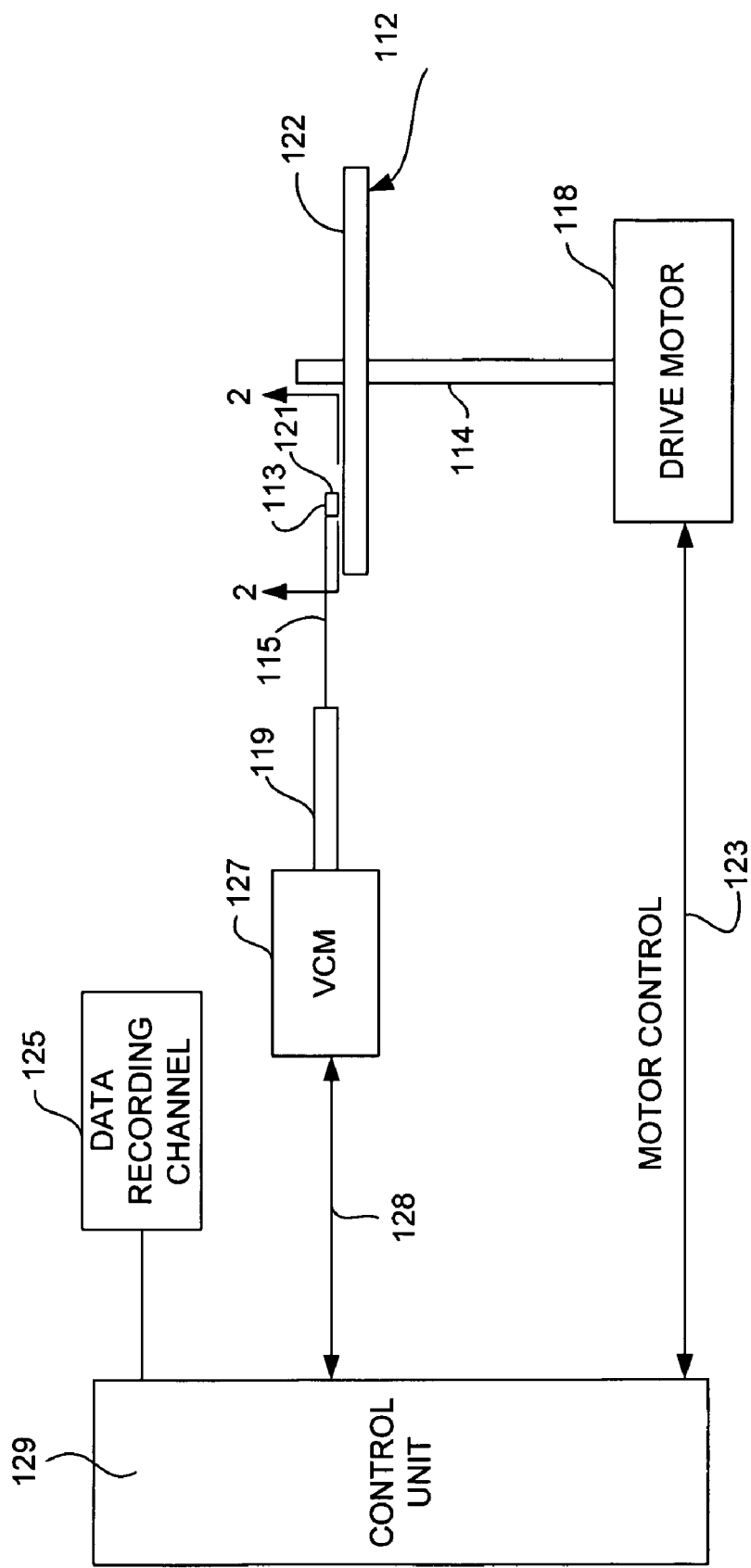
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 221. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
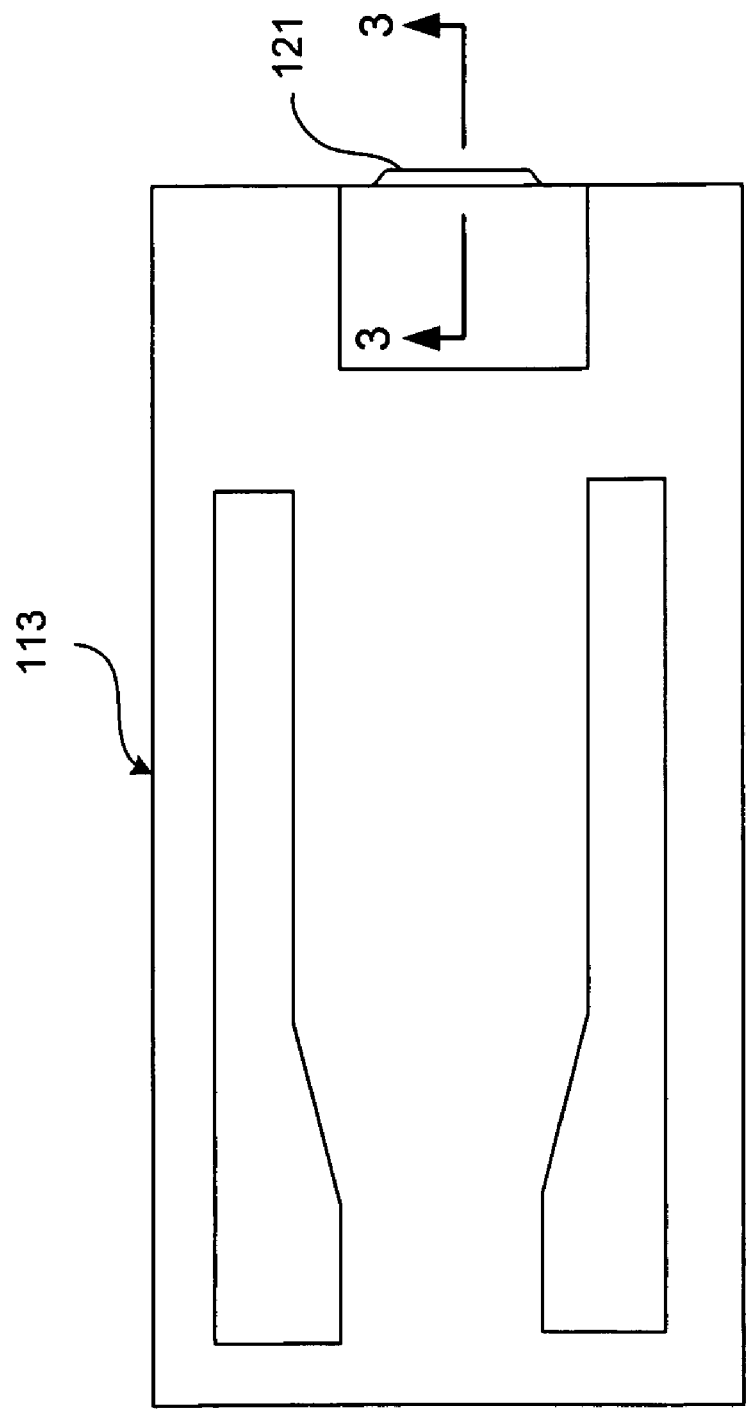
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
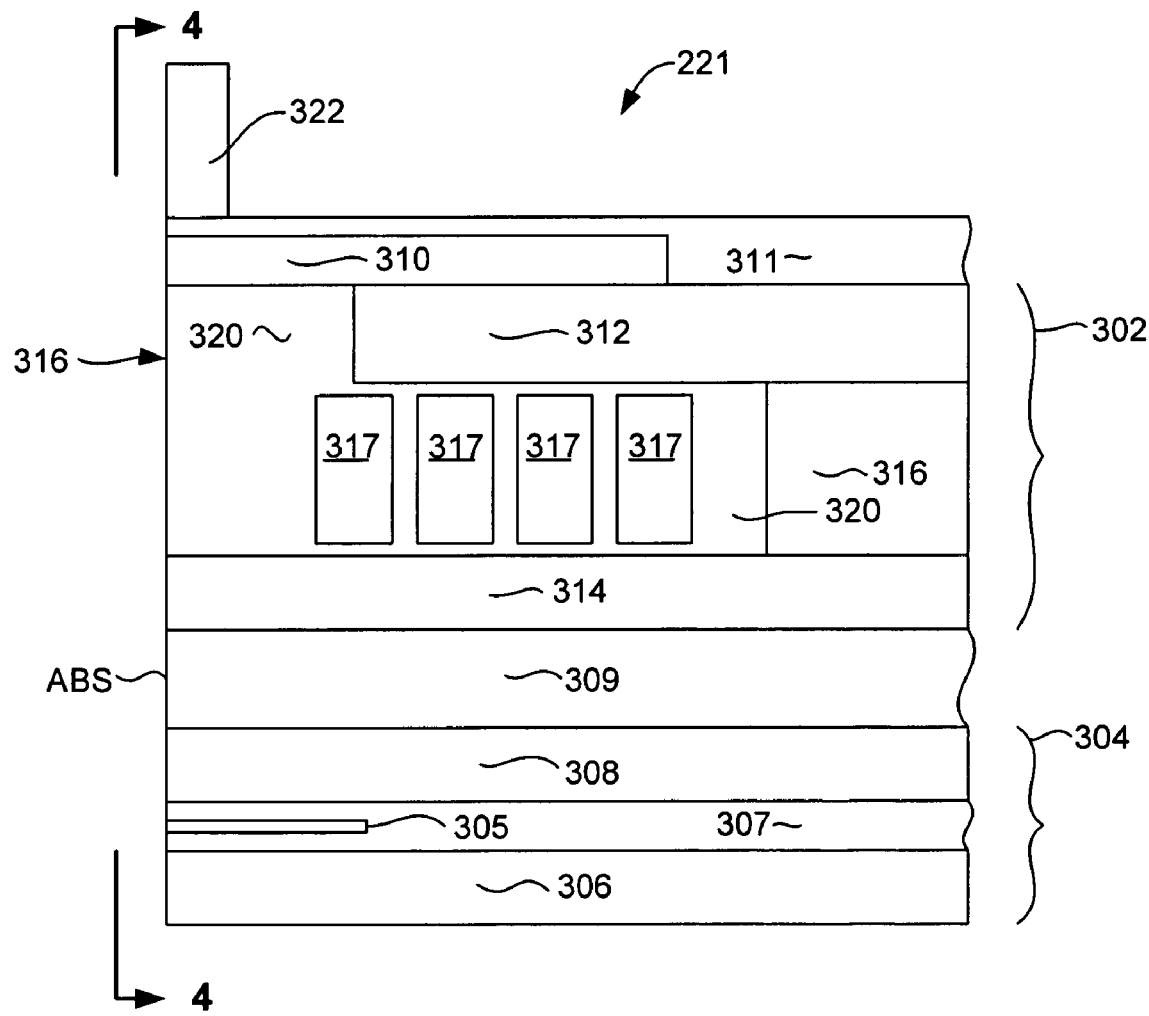
FIG. 3 is a cross sectional view view, taken from line 3-3 of FIG. 2 and rotated 90 degrees counterclockwise, of a magnetic head according to an embodiment of the present invention.

With reference now to FIG. 3, the magnetic head 221 for use in a perpendicular magnetic recording system is described. The head 221 includes a write element 302 and a read element 304. The read element includes a magnetoresistive sensor 305, such as a giant magnetoresistive (GMR) or a tunnel valve (TMR). However, the sensor 305 could be another type of sensor such as a current in plane (CIP) GMR sensor or, a tunnel junction sensor (TMR) or some other type of sensor. The sensor 305 is located between and insulated from first and second magnetic shields 306, 308 and embedded in a dielectric material 307. The magnetic shields 306, 308, which can be constructed of for example CoFe or NiFe, absorb magnetic fields such as those from uptrack or down track data signals, ensuring that the read sensor 304 only detects the desired data track located between the shields 306, 308. A non-magnetic, electrically insulating gap layer 309 may be provided between the shield 308 and the write head 302.

Figure 4:
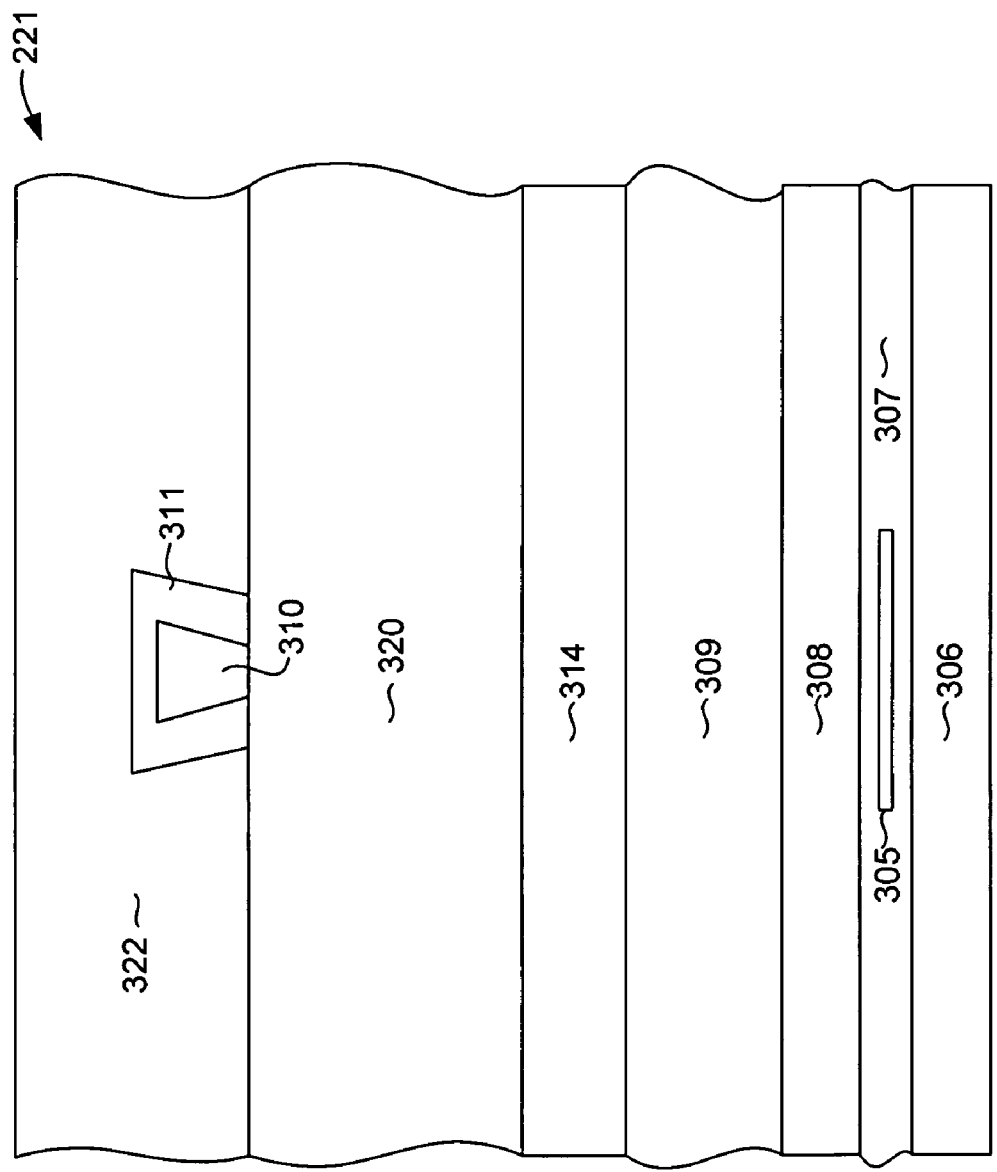
FIG. 4 is an ABS view of the write head taken from line 4-4 of FIG. 3.

With continued reference to FIG. 3, the write element 302 includes a write pole 310 that is magnetically connected with a magnetic shaping layer 312, and is embedded within an insulation material 311. The write pole 310 has a small cross section at the air bearing surface (as seen in FIG. 4) and is constructed of a material having a high saturation moment, such as NiFe or CoFe. More preferably, the write pole 310 is constructed as a lamination of layers of magnetic material separated by thin layers of non-magnetic material. The write element 302 also has a return pole 314 that preferably has a surface exposed at the ABS and has a cross section parallel with the ABS surface that is much larger than that of the write pole 310. The return pole 314 is magnetically connected with the shaping layer 312 by a back gap portion 316. The shaping layer 312, return pole 314 and back gap 316 can be constructed of, for example, NiFe, CoFe or some other magnetic material.

An electrically conductive write coil 317, shown in cross section in FIG. 3, passes through the write element 302 between the shaping layer 312, and the return pole 314. The write coil 317 is surrounded by an electrically insulating material 320 that electrically insulates the turns of the coil 317 from one another and electrically isolates the coil 317 from the surrounding magnetic structures 310, 312, 316, 314. When a current passes through the coil 317, the resulting magnetic field causes a magnetic flux to flow through the return pole 314, back gap 316, shaping layer 312 and write pole 310. This magnetic flux causes a write field 321 to be emitted toward an adjacent magnetic medium. The shaping layer 312 is also surrounded by an insulation layer 321 which separates the shaping layer 312 from the ABS. The insulation layers 320, 321, 311 can all be constructed of the same material, such as alumina ($Al_2O_3$) or of different electrically insulating materials.

The write head element 302 may also include a trailing shield 322, which can be constructed of a magnetic material such as NiFe or some other material. With reference to FIG. 4, the trailing shield 322 may be configured to wrap around the write pole 310 to provide side shielding as well as trailing shielding from stray magnetic fields. These stray magnetic fields can be from the write head 302 itself, or could also be from adjacent track signals or from magnetic fields from external sources. Alternatively, the trailing shield 322 can be constructed such that it does not wrap around the sides of the write pole 310, providing a purely trailing shield function.

As seen in FIG. 4, the write pole 310 preferably has a trapezoidal shape as viewed from the ABS. This trapezoidal shape, wherein the write pole 310 is narrower at the leading edge than at the trailing edge prevents skew related adjacent track interference when the write head is located at inner and outer portions of magnetic disk (FIG. 1).

There are various dimensions of the write pole 310 that are critical to good magnetic performance. For example, the width of the write pole 310 at the trailing edge determines the track width of the sensor and should be carefully controlled. In addition, the trailing edge of the write pole 310 should be straight and well defined, terminating at sharp well defined lateral edges. Other dimensions greatly affect write pole performance as well.

Figure 5:
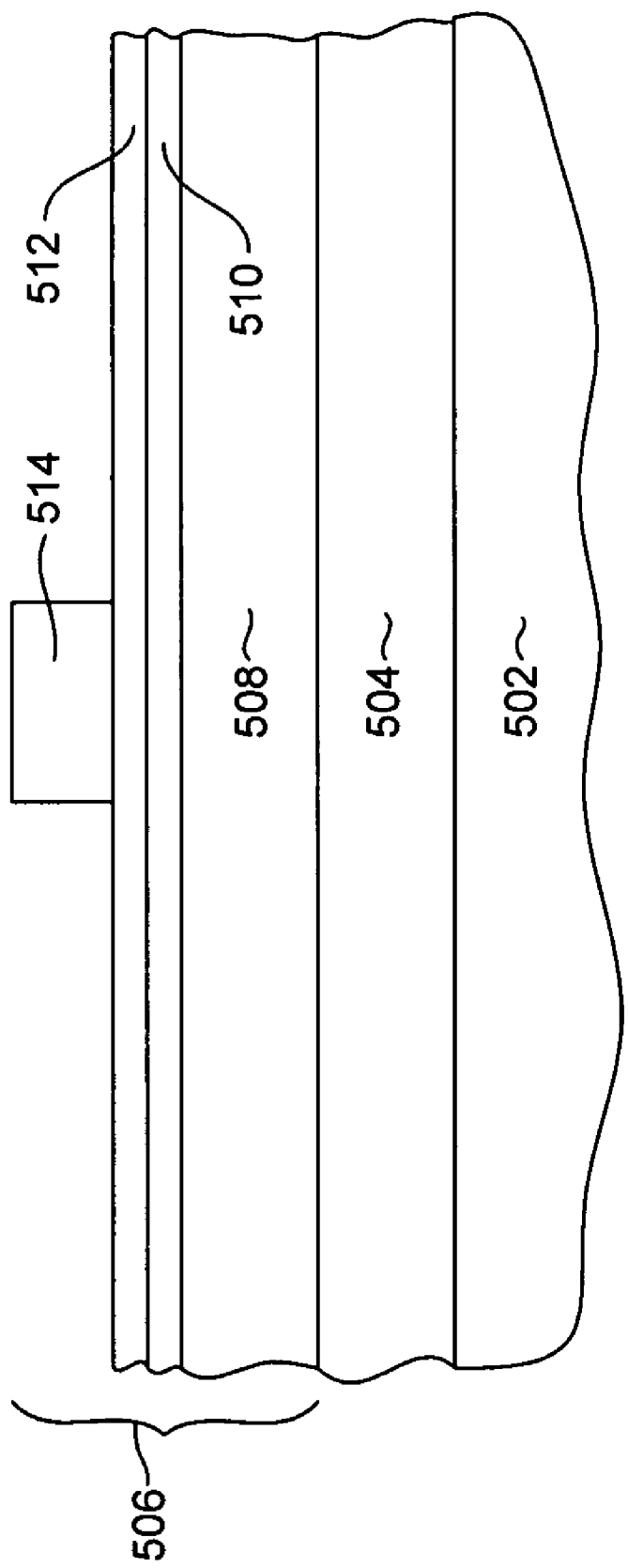

With reference to FIGS. 5-10 a method for constructing a write pole for a perpendicular write head is described. The method allows the write pole to be constructed with well controlled critical dimensions, while avoiding damage to the trailing edge surface during manufacture. With particular reference to FIG. 5 a substrate 502 is provided. The substrate 502 can include all or a portion of the shaping layer 312 and insulation layer 320 described earlier with reference to FIG. 3. One or more layers of magnetic write pole material 504 are deposited over the substrate. The write pole material 504 can be a single layer of magnetic material, but is preferably a lamination of magnetic layers such as CoFe separated by thin layers of non-magnetic material such as alumina. Then, with continued reference to FIG. 5, a series of mask layers 506 are deposited over the magnetic write pole material 504. The mask layers 506 can include a first image transfer layer 508, a hard mask layer 510 as second image transfer layer 512 and a photoresist mask 514. The first and second image transfer layers 508, 512 can be constructed of a soluble polyimide such as DURAMIDE® or some other non-photosensitive polymer material.

The first image transfer layer 508 can have a thickness of 100 to 1500 nm or about 1200 nm. The second image transfer layer 512 can be thinner, having a thickness of 40-160 nm or about 100 nm. The hard mask 510 can be constructed of, for example, $SiO_2$, and can have a thickness of 50 to 150 nm or about 100 nm. The photoresist layer 514 can have a thickness of 200-300 nm or about 250 nm. The photoresist layer 514 is preferably thick enough to allow its image to be transferred to the underlying layers, but thin enough to allow high resolution photolithography. As shown in FIG. 5, the photoresist layer is photolithographically patterned to form it with a width to define a trackwidth of the write pole.

Figure 6:
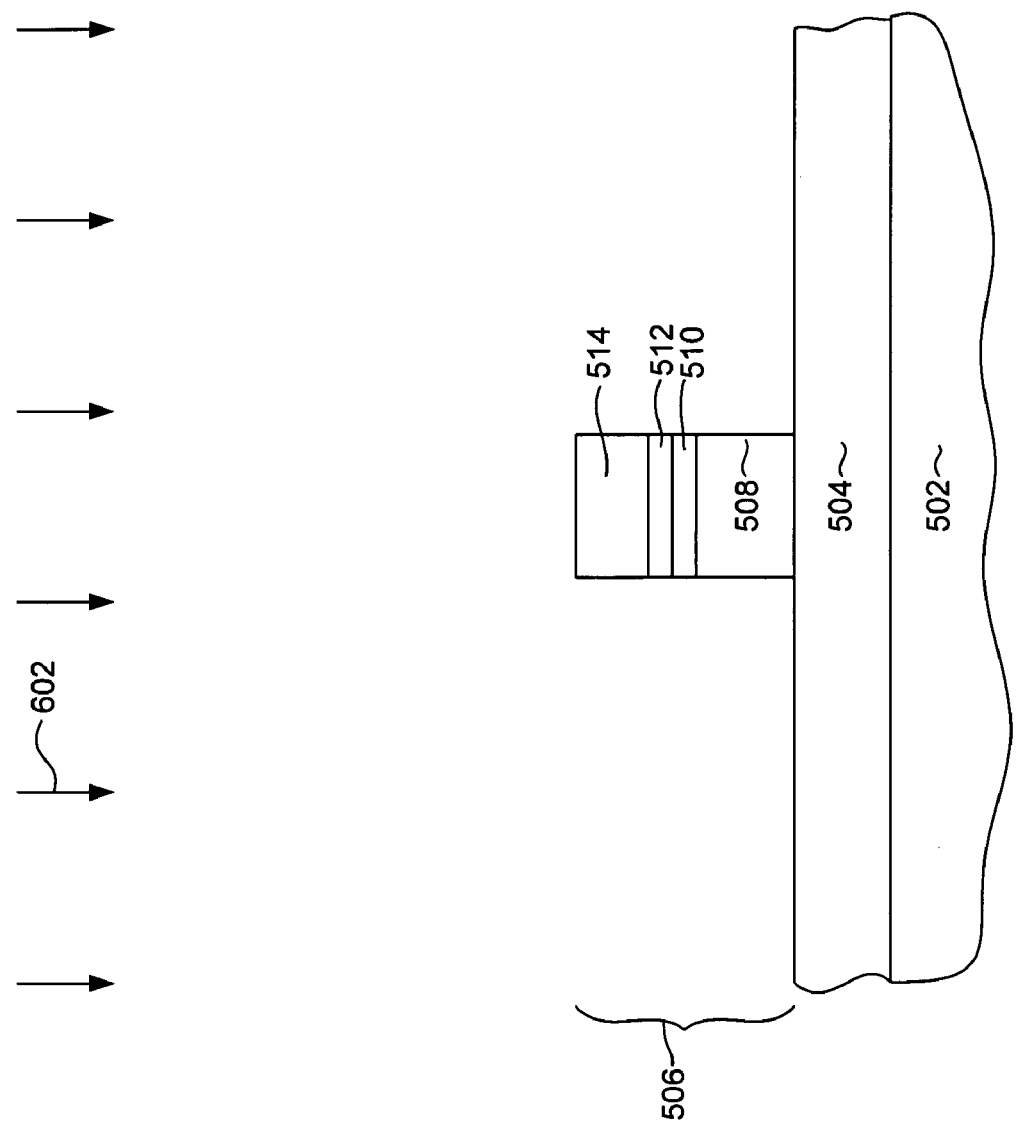

With reference now to FIG. 6, a material removal process 602 such as reactive ion etching (RIE) is performed to remove portions of the mask layers 508, 510, 512 that are not protected by the photoresist layer 514, thereby transferring the image of the photoresist mask 514 onto the underlying mask layers.

Figure 7:
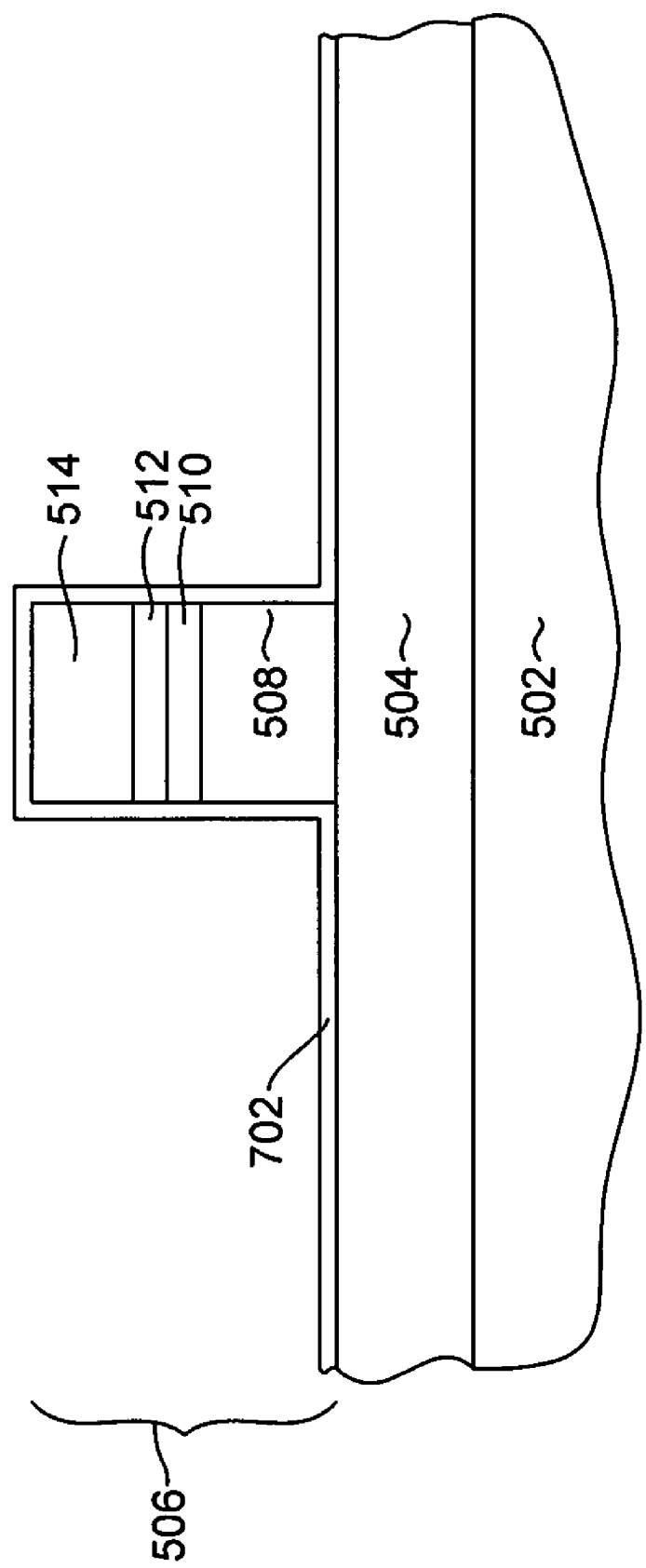

Then, with reference to FIG. 7, a thin layer of hard mask material 702 such as alumina is deposited over the mask structure 506 and the write pole material 504. Although various material could possibly be used for the thin hard mask layer 702, it is preferably constructed of alumina ($Al_2O_3$) deposited by a conformal deposition method such as atomic layer deposition (ALD), chemical vapor deposition (CVD), etc., and can be deposited to a thickness of 5-30 nm.

Figure 8:
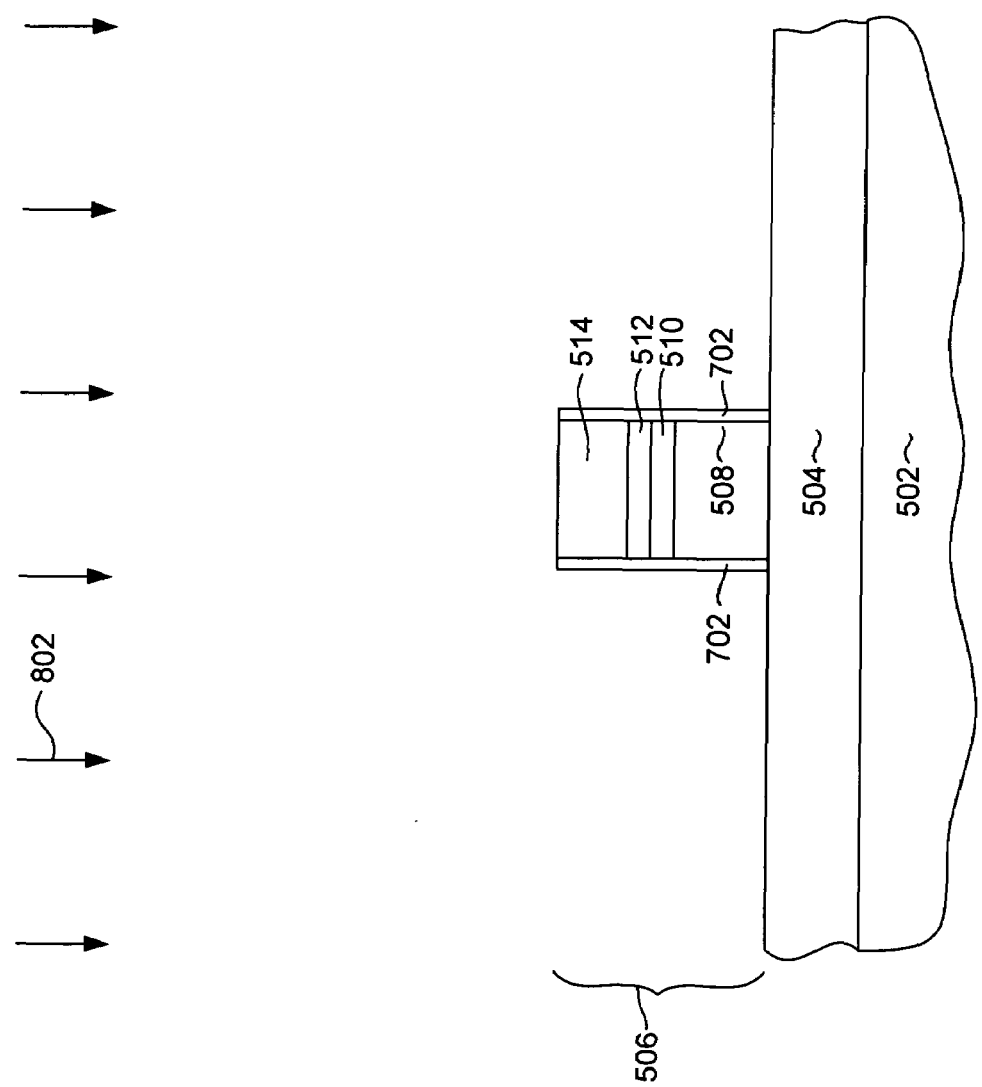

Then, with reference to FIG. 8, a material removal process 802 such as ion milling is performed. The material removal process is preferably a directional process that will preferentially remove horizontally disposed portions of the hard mask layer 702 leaving vertically disposed hard mask side walls 702 on the sides of the mask structure 506. With this in mind, the material removal process 802 is preferably an ion mill performed in an atmosphere containing Ar or $CHF_3$.

Figure 9:
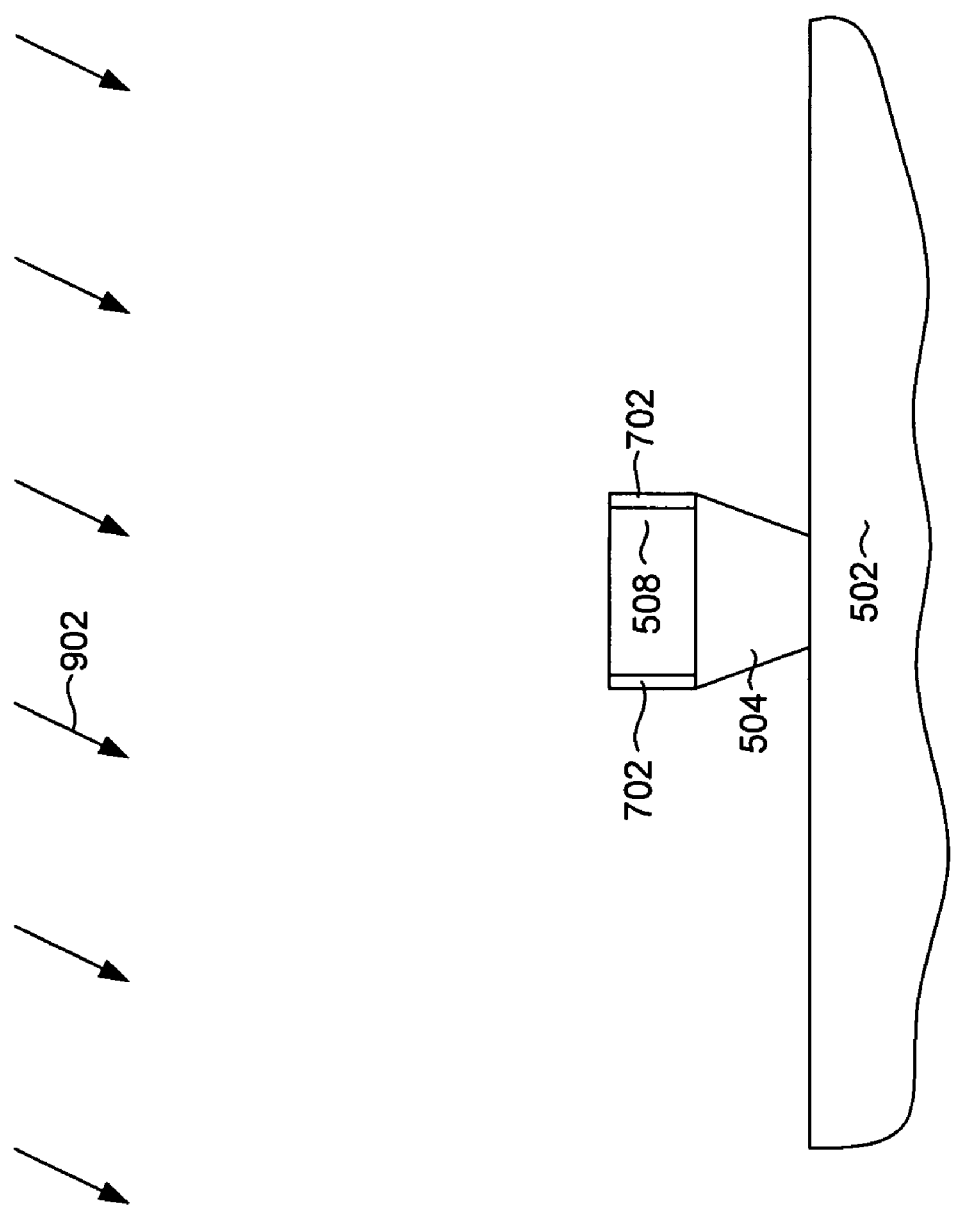

With reference now to FIG. 9, a material removal process 902 is performed to remove portions of the write pole material 504 that are not protected by the remaining mask structure 506. The material removal process 902 is preferably ion milling and is preferably performed at one or more angles with respect to normal in order to form the write pole 504 with a desired tapered, trapezoidal shape. The material removal process 902 could be a continuation of the material removal process 802 used to form the side walls 702. For example an ion mill using an atmosphere containing Ar or $CHF_3$ could be used to define the side walls 702 and then could be continued to define the write pole.

Then, with reference to FIG. 10, a clean up process is used to remove the remaining mask material 506 including the remaining image transfer layer 508 and hard mask side walls 702 (FIG. 9). The process used to remove the mask material 506 can be a relatively gentle process such as tetramethylammonium hydroxide solution (TMAH) based etch and N-methylpyrollidone (NMP) strip.

As can be seen, the use of hard mask side walls 702 rather than an alumina hard mask that covers the entire top of the write pole 504 provides all of the advantage of a hard mask, without the problems of hard mask removal. The presence of the alumina side walls 702 provides exceptional masking during the ion mill 902 (FIG. 9), defining the write pole 504 with a sharp well defined trailing edge. As mentioned above in the Background of the Invention, the use of an alumina hard mask layer across the top of the write pole 504 would require aggressive, destructive processes to remove the hard mask. These harsh processes damage the write pole 504. However, because the present invention employs hard masks in the form of vertical side walls 702, such harsh hard mask removal processes can be avoided, resulting in a damage free write pole 504. It should be pointed out that, since the vertical side walls 702 make the effective mask structure 506 wider than would be the case otherwise, the photoresist mask 514 (FIG. 5) should be patterned slightly narrower to accommodate the thickness of the side walls 702.

After the write pole has been formed, a protective insulation layer such as alumina can be deposited. A trailing shield (322, FIG. 4) can also be formed by depositing a magnetic material such as NiFe after depositing a non-magnetic material to define a trailing shield gap.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for constructing a magnetic write pole for a perpendicular magnetic recording, the method comprising:
   depositing a magnetic write pole material;
   forming a mask structure over the write pole material, the mask structure having sides;
   depositing an alumina hard mask layer over the mask structure and the magnetic write pole material layer;
   performing a first material removal process to preferentially remove horizontally disposed portions of the hard mask layer, leaving vertically disposed hard mask walls at the sides; and
   performing a second material removal process to remove portions of the magnetic write pole material that are not covered by the mask structure or hard mask walls.

2. The method as in claim 1 wherein the first material removal process comprises ion milling in an atmosphere that contains Ar.

3. The method as in claim 1 wherein the first material removal process comprises ion milling in an atmosphere that contains $CHF_3$.

4. The method as in claim 1 wherein the first material removal process comprises ion milling in an atmosphere that contains Ar, and the second material removal process comprises ion milling at an angle with respect to normal to form a write pole having a trapezoidal shape.

5. The method as in claim 1 wherein the forming a mask structure includes depositing at least one mask layer, depositing a photoresist mask over the at least one mask layer, photolithographically patterning the photoresist mask layer and transferring an image of the photoresist mask onto the at least one mask layer.

6. The method as in claim 1 wherein the forming a mask structure includes depositing at least one mask layer, depositing a photoresist mask over the at least one mask layer, photolithographically patterning the photoresist mask layer and performing a reactive ion etch (RIE) to transfer the pattern of the photoresist mask onto the at least one mask layer.

7. The method as in claim 1 wherein the forming a mask structure further comprises:
   depositing an image transfer layer;
   depositing a $SiO_2$ hard mask layer;
   depositing a photoresist layer;
   photolithographically patterning the photoresist layer; and
   performing a reactive ion etch (RIE) to transfer an image of the patterned photoresist onto the underlying $SiO_2$ hard mask and image transfer layers.

8. The method as in claim 1 wherein the forming a mask structure further comprises:
   depositing a first image transfer layer;
   depositing a $SiO_2$ hard mask layer over the first image transfer layer;
   depositing a second image transfer layer over the $SiO_2$ hard mask layer;
   depositing a photoresist layer;
   photolithographically patterning the photoresist layer; and
   performing a reactive ion etch (RIE) to transfer an image of the patterned photoresist onto the underlying $SiO_2$ hard mask and first and second image transfer layers.

9. The method as in claim 8 wherein the image transfer layer comprises a soluble polyimide.

10. The method as in claim 1 wherein the hard mask layer deposited over the mask structure and the write pole material comprises alumina ($Al_2O_3$) having a thickness of 5 to 30 nm.

11. The method as in claim 1 wherein the depositing a hard mask layer over the mask structure and magnetic write pole material comprises depositing alumina ($Al_2O_3$) by a conformal deposition method.

12. The method as in claim 1 wherein the depositing a hard mask layer of the mask structure and magnetic write pole material comprises depositing alumina ($Al_2O_3$) by atomic layer deposition (ALD).

13. The method as in claim 1 wherein the depositing a hard mask layer of the mask structure and magnetic write pole material comprises depositing alumina ($Al_2O_3$) by chemical vapor deposition (CVD).

14. The method as in claim 1 further comprising, after performing the second material removal process, performing a clean up process that includes a tetramethylammonium hydroxide solution (TMAH) etch and N-methylpyrollidone (NMP) strip.

15. The method for manufacturing a write pole for a perpendicular magnetic write head, comprising:
   providing a substrate;
   depositing a magnetic write pole material over the substrate;
   depositing a first image transfer layer over the substrate;
   depositing a hard mask over the first image transfer layer;
   depositing a second image transfer layer over the hard mask layer;
   depositing a layer of photoresist over the second image transfer layer;
   photolithographically patterning the photoresist layer to form a photoresist mask;
   performing a reactive ion etch (RIE) to transfer an image of the photoresist mask onto the underlying first and second image transfer layers and the hard mask;
   depositing a layer of alumina by a conformal deposition method over the underlying first and second image transfer layers and the hard mask wherein the alumina is deposited to a thickness of 5-30 nm;
   performing a first ion mill to remove horizontally disposed portions of the alumina layer to form alumina walls; and
   performing a second ion mill to remove the magnetic pole material that are not covered by the alumina layer to form a write pole.

16. The method as in claim 15 wherein the first ion mill is performed in an atmosphere that contains Ar.

17. The method as in claim 15 wherein the first ion mill is performed in an atmosphere that contains $CHF_3$.

18. The method as in claim 15 further comprising, after performing the second ion mill to define the write pole, performing a clean up process that includes tetramethylammonium hydroxide solution (TMAH) etch and N-methylpyrolidone (NMP).

19. A method for manufacturing a write pole for a perpendicular magnetic write head, comprising:
   providing a substrate;
   depositing a magnetic write pole material over the substrate;
   depositing a first image transfer layer over the substrate;
   depositing a hard mask over the first image transfer layer;

depositing a second image transfer layer over the hard mask layer;

depositing a layer of photoresist over the second image transfer layer;

photolithographically patterning the photoresist layer to form a photoresist mask;

performing a reactive ion etch (RIE) to transfer an image of the photoresist mask onto the underlying first and second image transfer layers and the hard mask;

depositing a layer of alumina wherein the alumina over the underlying first and second image transfer layers and the hard mask layer is deposited by a conformal deposition method to a thickness of 10-30 nm, and wherein at least a portion of the ion mill is performed in an atmosphere that contains Ar;

performing an ion mill to remove horizontally disposed portions of the alumina layer to form alumina walls; and continuing the ion mill to remove the magnetic pole material that are not covered by the alumina layer to form a write pole.

20. A method for manufacturing a write pole for a perpendicular magnetic write head, comprising:

providing a substrate;

depositing a magnetic write pole material over the substrate;

depositing a first image transfer layer over the substrate;

depositing a hard mask over the first image transfer layer;

depositing a second image transfer layer over the hard mask layer;

depositing a layer of photoresist over the second image transfer layer;

photolithographically patterning the photoresist layer to form a photoresist mask;

performing a reactive ion etch (RIE) to transfer an image of the photoresist mask onto the underlying first and second image transfer layers and the hard mask;

depositing a layer of alumina over the underlying first and second image transfer layers and the hard mask;

performing an ion mill to remove horizontally disposed portions of the alumina layer to form alumina walls; and continuing the ion mill to remove the magnetic pole material that are not covered by the alumina layer to form a write pole;

wherein the alumina layer is deposited by a conformal deposition method to a thickness of 5-30 nm, and wherein at least a portion of the ion mill is performed in an atmosphere that contains $CHF_3$.

* * * * *